J. C. & O. M. LOYER.

COMPOSITION SHINGLE.

APPLICATION FILED FEB. 12, 1917.

Reissued Oct. 30, 1917. 14,387.

Inventor
JOSEPH C. LOYER.
OLIVER M. LOYER.

Witness
Emma B. Wisner.

By Charles E. Wisner
Attorney

UNITED STATES PATENT OFFICE.

JOSEPH C. LOYER AND OLIVER M. LOYER, OF DETROIT, MICHIGAN.

COMPOSITION SHINGLE.

14,387. Specification of Reissued Letters Patent. Reissued Oct. 30, 1917.

Original No. 1,191,932, dated July 18, 1916, Serial No. 68,758, filed December 27, 1915. Application for reissue filed February 12, 1917. Serial No. 148,247.

*To all whom it may concern:*

Be it known that we, JOSEPH C. LOYER and OLIVER M. LOYER, citizens of the United States, residing at Detroit, county of Wayne, State of Michigan, have invented a certain new and useful Improvement in Composition Shingles, and declare the following to be a full, clear, and exact description of the same, such as will enable others skilled in the art to which it pertains to make and use the same, reference being had to the accompanying drawings, which form a part of this specification.

This invention relates to composition shingles for use in the roofing or walls of houses and other buildings.

An object of the invention is a shingle of pliable nature, the exposed surface of which is durable and the covered surfaces of which are provided with a covering of felt, tar paper or the like, preventing a loss of heat from the building during cold periods and protecting the interior of the building from the hot sun of warmer periods.

A further object is a shingle of pliable nature provided with metal reinforcement extending a portion of the length of the shingle to prevent warping of the exposed ends or displacement thereof by wind or other cause.

An additional object is a shingle formed of comparatively inexpensive ingredients, the base of which is preferably asphaltum or the like adapted to be molded or rolled to form and covering the lower end embedded in part of the upper surface is a sheet of tarred paper, felt or similar material providing an effective sheathing laid with the shingle and avoiding the necessity of first covering the roof or walls of the building with separate sheathing material.

These several objects and the various novel features of the invention are hereinafter more fully described and claimed and shown in the accompanying drawings in which—

Similar characters refer to similar parts throughout the drawing and specification.

Figure 2:
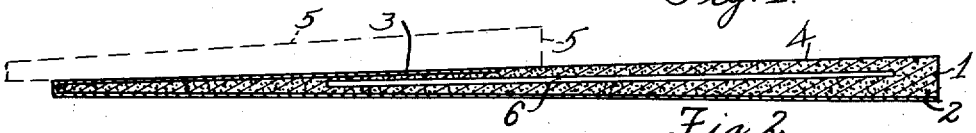
Fig. 2 is a cross section thereof taken on line $x$—$x$ of Fig. 1.

The base 1 of the shingle is preferably composed of asphaltum, ground-cinders, sand, or similar filler. Pitch or tar may also be used in the composition and various ingredients other than sand or cinders may be utilized. Cinders, however, is the preferable filler on account of its cheapness. The shingle is preferably formed by passing the previously mixed material between rollers set to give the shingle greater thickness at one end than at the other, as in the ordinary wood shingle. A tarred paper or felt covering 2 preferably of a single piece extends across the bottom side of the shingle, as indicated in Fig. 2, about the thin end thereof and part way across the upper surface as indicated at 3. The composition base being quite pliable before hardening, the said felt or paper covering may be embedded in the material as indicated on the upper side during formation, making the upper surface of the shingle even or flat. The rollers for forming the shingle are preferably heated so that the material is readily formed and also the asphaltum is drawn to the surface of the uncovered part 4.

Figure 1:
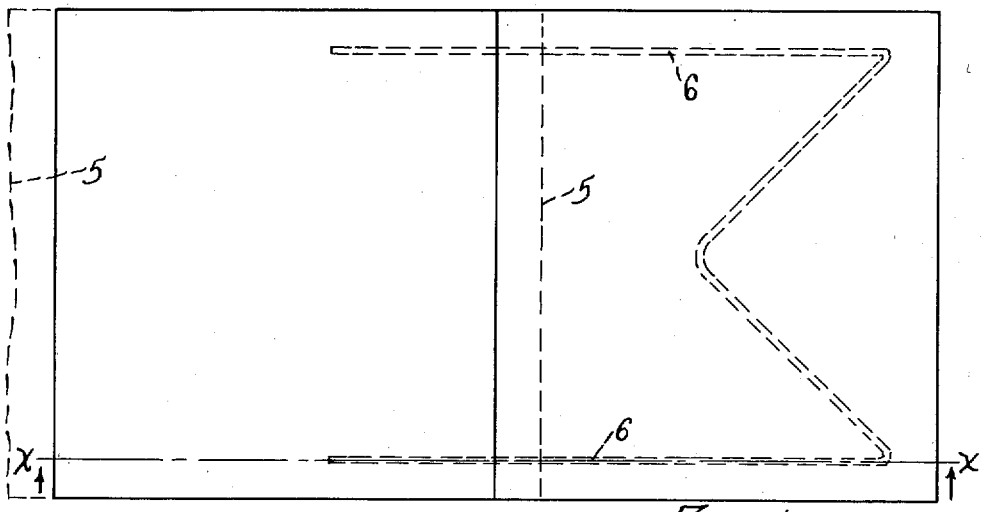
Figure 1 is a plan view of a shingle embodying our invention.

In laying the shingle the uncovered portion 4 is exposed to the weather and a succeeding shingle is placed thereon slightly overlapping the portions 3 of the felt covering on the top surface as indicated by dotted lines 5 in Figs. 1 and 2. In this manner the felt or paper is entirely covered by the superposed rows of shingles when placed on the roof leaving the asphalt face 4 only exposed to action by the elements. This face 4 after formation and subsequent hardening is very durable and the portions most liable to deterioration by action of the elements are fully shielded. Thus a shingle is produced that is of long life providing an efficient protection from heat or cold and the necessity of first sheathing the roof by the laying of a tarred paper or the like on which the shingles are laid is avoided. By embedding the tarred paper or felt in a portion of the upper surface of the shingle the superimposed shingle may lie flat in contact with the said surface with the lower edge of the butt end of the shingle in contact with the upper surface of the lower shingle. Without embedding the tarred paper in the upper surface, the butt end of the shingle would be raised the thickness of the paper or felt above the upper surface of the lower shingle allowing the water and snow to beat in under the shingle. Furthermore, with the lower tarred paper surface of the one shingle contacting the upper tarred paper surface of the other, a cementitious union between the shingles takes place subsequent to the laying thereof preventing displacement of the shingle by ordinary wind or rain storms.

Figure 3:
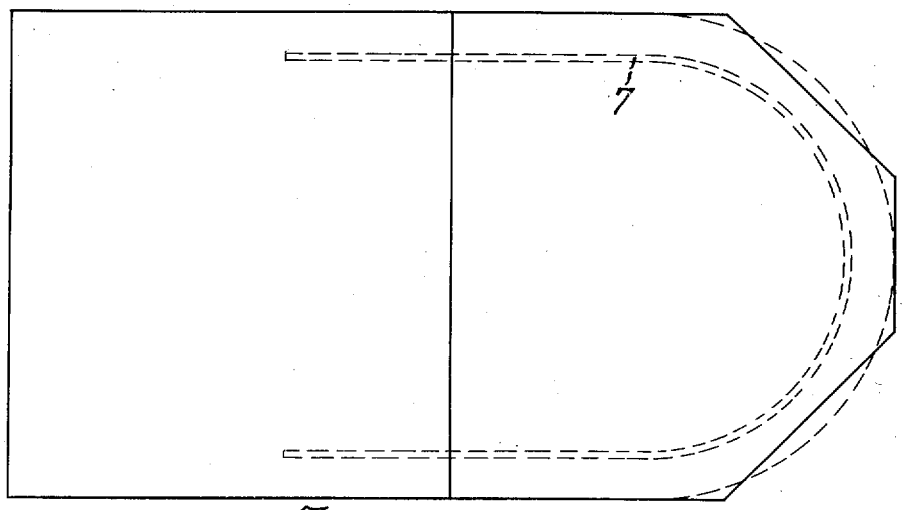
Fig. 3 is a plan view showing a shingle of a different form than shown in Fig. 1.

A shingle formed of the type of materials herein indicated is somewhat pliable so that various curved surfaces may be readily conformed to by bending the shingle, and to prevent warping of the shingle by action of the sun and lifting of the edges of the shingles by wind storms and the like, the lower exposed portion is provided with a metal reinforcing member 6 preferably of wire. With the square ended shingle the wire preferably has the form shown in Fig. 1 and in shingles of other forms, as indicated by full and dotted lines in Fig. 3, the metal reinforcement is preferably of a slightly different shape as shown by the dotted lines 7. It is to be noted that this wire terminates slightly beyond the edge of the felt or paper covering 3 on the upper surface and thus extends beneath and is held by the superposed shingle placed thereon, and is thus held secured in position. The stiffness of the wire will prevent curling of the shingles at the ends or warping thereof.

As previously stated the shingle may be formed of various compositions as asphaltum, pitch, tar and the like combined with ground-cinders, sand, or similar ingredients in various proportions suitable for the purpose, the essential characteristic being that the finished shingle shall be somewhat pliable in nature, having a reinforcing member preventing the warping of the shingle by action of the elements and by the provision of a paper or felt covering unexposed to the action of the elements a shingle is produced very durable in nature and comparatively inexpensive to manufacture.

By the addition of ground-slate or the like on the upper surface of the uncovered portion 4 while in a green state, a shingle of various colors may be produced as may be desired.

Having thus briefly described our invention, and its utility, what we claim and desire to secure by Letters Patent of the United States is—

1. A composition shingle comprising a base formed of a cementitious material and an aggregate, and being pliable in character, a tarred paper or felt covering and adhering to its entire lower and a portion of its upper surface, and a metal reinforcement wholly embedded in the cementitious material extending part way of the length of the shingle from the butt end, the uncovered portion only of the shingle being exposed to weather when laid.

2. A composition shingle comprising a base formed of asphaltum, ground cinders or the like, thicker at the butt than at the top end, a tarred paper or felt covering and adhering to its entire lower and a portion of its upper surface, the uncovered portion only being exposed when laid, and a metal reinforcement wholly embedded in the base.

3. A composition shingle comprising a base formed of pliable cementitious material and an aggregate, a tarred paper or felt covering on its entire lower and a portion of its upper surface, the uncovered portion only being exposed when laid, and a metal reinforcement wholly embedded in the base consisting of a wire extending in parallel lines adjacent each longitudinal side of the shingle and a connecting portion near the butt end of the shingle of a form adapted to prevent transverse warping of the shingle.

4. A composition shingle comprising a base formed of a pliable cementitious material and an aggregate, a tarred paper or felt covering on its entire lower and a portion of its upper surface, the uncovered portion only being exposed when laid, and a metal reinforcement wholly embedded in the base, the length of which is not less than the length of the exposed portion of the shingle and consisting of a wire extending in parallel lines adjacent each longitudinal side of the shingle, and a connecting portion extending between the parallel portions near the butt end of the shingle along lines out of parallelism with said side portion.

5. A composition shingle comprising a base of pliable cementitious material of a character that hardens after molding, a tarred paper or felt covering on the entire lower and a portion of its upper surface adhering to the base, the tarred paper or felt being embedded in the base on the upper side so that the exposed surface of the base and the upper surface of the felt are in the same plane, and a metal reinforcement embedded in the base.

6. A composition shingle comprising a base of pliable cementitious material of a character that hardens after molding, and a tarred paper or felt covering on the entire lower and a portion of its upper surface adhering to the base, the tarred paper or felt being embedded in the base on the upper side so that the exposed surface of the base and the upper surface of the felt are in the same plane.

7. A composition shingle comprising a base formed of asphaltum, ground-cinders, or the like, and a tarred paper or felt covering the entire lower and a portion of the upper surface, the uncovered portion only being exposed when laid, the tarred paper or felt being embedded in the base on the upper side so that the exposed surface of the base and the upper surface of the covering are in the same plane.

In testimony whereof, we sign this specification.

JOSEPH C. LOYER.
OLIVER M. LOYER.